UNITED STATES PATENT OFFICE 2,388,008

PRODUCTION OF HYDROCARBONS

Mathias Pier, Heidelberg, and Gerhard Free and Wilhelm v. Fuener, Ludwigshafen-on-the-Rhine, Germany; vested in the Alien Property Custodian No Drawing. Application November 23, 1940, Serial No. 366,914. In Germany November 28, 1939

8 Claims. (Cl. 196—52)

The present invention relates to a process for the production of valuable hydrocarbons from hydrocarbons of a higher molecular weight.

We have found that the conversion of hydrocarbons, especially the cracking, reforming, isomerization and dehydrogenation of hydrocarbons at temperatures above 300° or 350° C. may be carried out with advantage in the presence of a catalyst containing compounds of barium and silicon which can be prepared by adding a barium compound which is capable of forming a silicate with an acid solution of a silica sol to a substance capable of forming a silica gel, allowing or causing said substance to set to a jelly, while it is in an acid condition corresponding for instance to a pH-value between about 3 and 7, and drying said jelly and heating it, to a temperature of at least about 300° C., if desired after removing soluble salts and/or acid therefrom by washing.

The catalyst according to our invention may be prepared, for example, by mixing a solution of sodium silicate with an acid, for example hydrochloric, sulphuric or nitric acid, or an organic acid so as to obtain a sol possessing a pH-value of from about 3 to 7, adding the oxide, hydroxide, chloride, carbonate or nitrate of barium or barium salts of organic acids, such as the oxalate, formate, acetate etc. or a solution of one or more of these compounds, and causing a jelly to be formed by allowing the mixture to stand or by heating it, or more preferably by adding an alkaline precipitant, especially ammonia, in such amounts only that the mass remains acid. The acid may be added to the solution of sodium silicate also together with the barium salt solution or to the mixture of the two solutions.

The acid jelly may also be soaked with the solution of a barium salt.

The catalyst so prepared is then dried and exposed to high temperatures of at least about 300° C., for example from 300° to 800° C.

As a rule, the finished catalyst should contain from about 0.5 to about 10 per cent of barium.

The catalyst is especially useful in cracking, reforming and isomerizing liquid hydrocarbons and in dehydrogenating hydrocarbons, especially gaseous hydrocarbons, for example butane. Liquid hydrocarbons are advantageously treated in the vapor phase, with or without the application of pressure, if desired in the presence of a gas, as for example hydrogen, which, however, need not be consumed in the reaction. As initial materials may be mentioned hydrocarbon oils, advantageously middle oils, heavy benzines or benzine fractions, as for example benzine fractions boiling from 150° to 200° C.

The catalyst may also be used as a carrier for compounds of metals of the 2nd to the 8th group of the periodic system, especially the oxides, sulphides, phosphates or halides of metals of the 5th to the 8th group of the periodic system.

A particular advantage of the catalyst resides in that it may be reactivated within a shorter time than other catalysts containing compounds of silicon and especially than catalysts free from barium, but otherwise having the same composition.

The following example serves to illustrate how the present invention may be carried out in practice, but the invention is not restricted to this example.

Example 650 grams of a sodium silicate solution containing 26 per cent of $SiO_2$ are diluted with water to a volume of 3 liters and afterwards acidified with 160 cubic centimeters of concentrated hydrochloric acid. This solution is brought to a pH-value of 4.5 to 5.0 by an addition of ammonia and, with continuous agitation, is then mixed with a solution of 687 grams of aluminum nitrate

$(Al(NO_3)_3.9H_2O)$ and 30 grams of ferric chloride ($FeCl_3.6H_2O$) as well as 30 grams of barium chloride in 2 liters of water. The acid thereby liberated is continuously neutralized with so much ammonia as to maintain a pH-value of 4.5 to 5.0 during the reaction which results in the setting of the mass to a jelly. The jelly is filtered off by suction, washed first with acidified water (pH=4.5 to 5.0), then with pure water, dried, shaped and heated to 450° C.

If a paraffin-base middle oil (boiling from 210° to 360° C.) be passed over 100 cubic centimeters of this catalyst at 460° C. at a rate of 100 cubic centimeters per hour, the reaction product contains 35 per cent of a fraction boiling up to 200° C. The catalyst thus has about the same activity as one of the same composition, but free from barium.

However, due to the barium compound contained in the catalyst, the time required for regenerating the same is by 30 per cent shorter than in the case of the catalyst free from barium.

What we claim is:

1. A process for the production of hydrocarbons from hydrocarbons of a higher molecular weight by heating at a temperature of 300° C., which comprises carrying out the reaction in the presence of a catalyst containing compounds of barium and silicon and having been prepared by causing an acid solution of an alkali metal silicate to set to a jelly which forms a gel upon drying, adding to the gel-forming substance, in the presence of an acid, a compound of barium capable of forming a silicate with an acid solution of a silica sol, drying the jelly containing compounds of barium and silicon and heating the gel formed to a temperature of at least about 300° C.

2. A process for the production of hydrocarbons from hydrocarbons of a higher molecular weight by heating at a temperature of 300° C., which comprises carrying out the reaction in the presence of a catalyst containing compounds of barium and silicon and having been prepared by adding an acid and a barium compound capable of forming a silicate with an acid solution of a silica sol to a solution of an alkali metal silicate, causing the mixture to set to a jelly, drying the jelly containing compounds of barium and silicon and heating the gel formed to a temperature of at least about 300° C.

3. Process according to claim 2 in which the catalyst is prepared by adding an aluminum salt besides the barium compound and an acid to a solution of an alkali metal silicate, causing the mixture to set to a jelly, drying it and heating the gel to a temperature of at least about 300° C.

4. Process according to claim 2 in which the catalyst is prepared by adding an aluminum salt and an iron salt besides the barium compound and an acid to a solution of an alkali metal silicate, causing the mixture to set to a jelly, drying it and heating the gel to a temperature of at least about 300° C.

5. Process according to claim 2 in which the solution of the alkali metal silicate is used in form of an acid silica sol.

6. Process according to claim 1 in which said barium compound is added to said jelly in the presence of an acid.

7. Process of cracking a hydrocarbon oil, which comprises exposing the hydrocarbon oil to a temperature above 350° C. in the presence of a catalyst containing compounds of barium and silicon and having been prepared by causing an acid solution of an alkali metal silicate to set to a jelly which forms a gel upon drying, adding to the gel-forming substance, in the presence of an acid, a compound of barium capable of forming a silicate with an acid solution of a silica sol, drying the jelly containing compounds of barium and silicium and heating the gel formed to a temperature of at least about 300° C.

8. Process of cracking a hydrocarbon oil, which comprises exposing the hydrocarbon oil to a temperature above 350° C. in the presence of hydrogen and of a catalyst containing compounds of barium and silicon prepared by causing an acid solution of an alkali metal silicate to set to a jelly which forms a gel upon drying, adding to the gel-forming substance, in the presence of an acid, a compound of barium capable of forming a silicate with an acid solution of a silica sol, drying the jelly containing compounds of barium and silicon and heating the gel formed to a temperature of at least about 300° C.

MATHIAS PIER.
GERHARD FREE.
WILHELM v. FUENER.